(No Model.) 2 Sheets—Sheet 1.

A. S. WEAVER.
BICYCLE.

No. 605,365. Patented June 7, 1898.

WITNESSES:
Edward Thorpe

INVENTOR
A. S. Weaver.
BY
ATTORNEYS.

(No Model.)
2 Sheets—Sheet 2.

A. S. WEAVER.
BICYCLE.

No. 605,365.

Patented June 7, 1898.

WITNESSES:
Edward Thorpe
Theo. G. Hoster

INVENTOR
A. S. Weaver.
BY
ATTORNEYS.

UNITED STATES PATENT OFFICE.

ALBERT SHELDON WEAVER, OF HAMILTON, CANADA.

BICYCLE.

SPECIFICATION forming part of Letters Patent No. 605,365, dated June 7, 1898.

Application filed September 9, 1896. Serial No. 605,281. (No model.)

*To all whom it may concern:*

Be it known that I, ALBERT SHELDON WEAVER, a subject of the Queen of Great Britain, residing at Hamilton, in the county of Wentworth, Province of Ontario, and Dominion of Canada, have invented a new and Improved Bicycle, of which the following is a full, clear, and exact description.

The object of the invention is to provide a new and improved bicycle which is simple and durable in construction and arranged for carrying a number of persons, the seats for which are arranged in pairs, one behind the other, and each person having a separate pedaling device and being enabled to steer the machine.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in both the figures.

Figure 1:
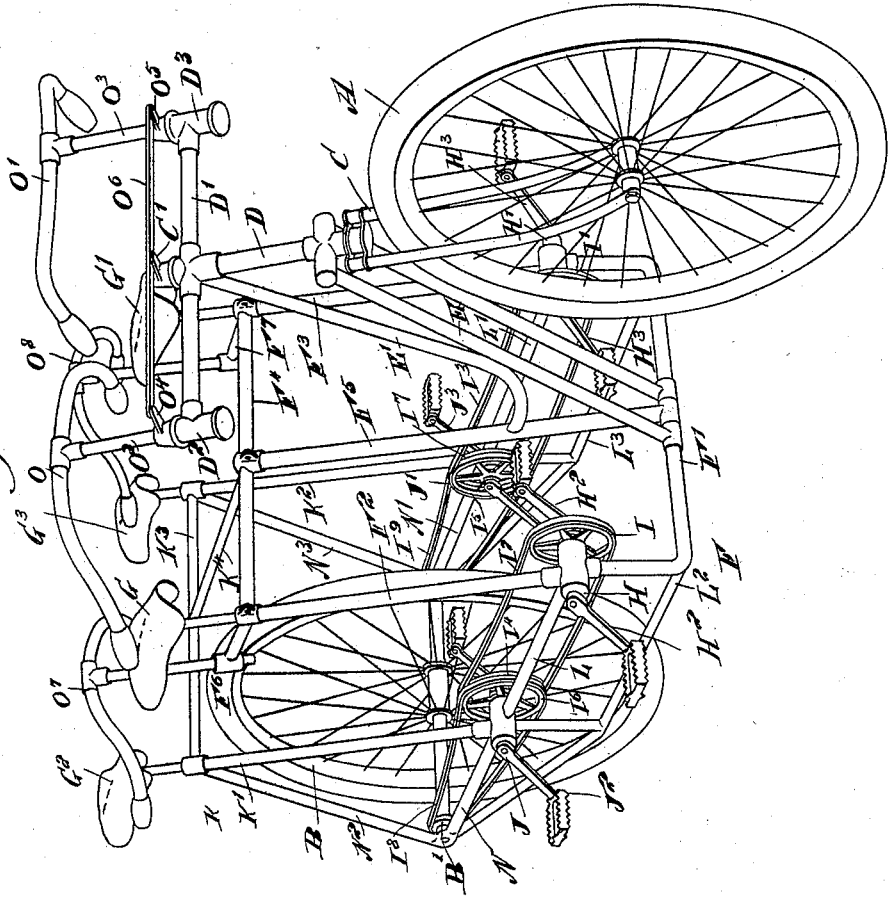
Figure 2:
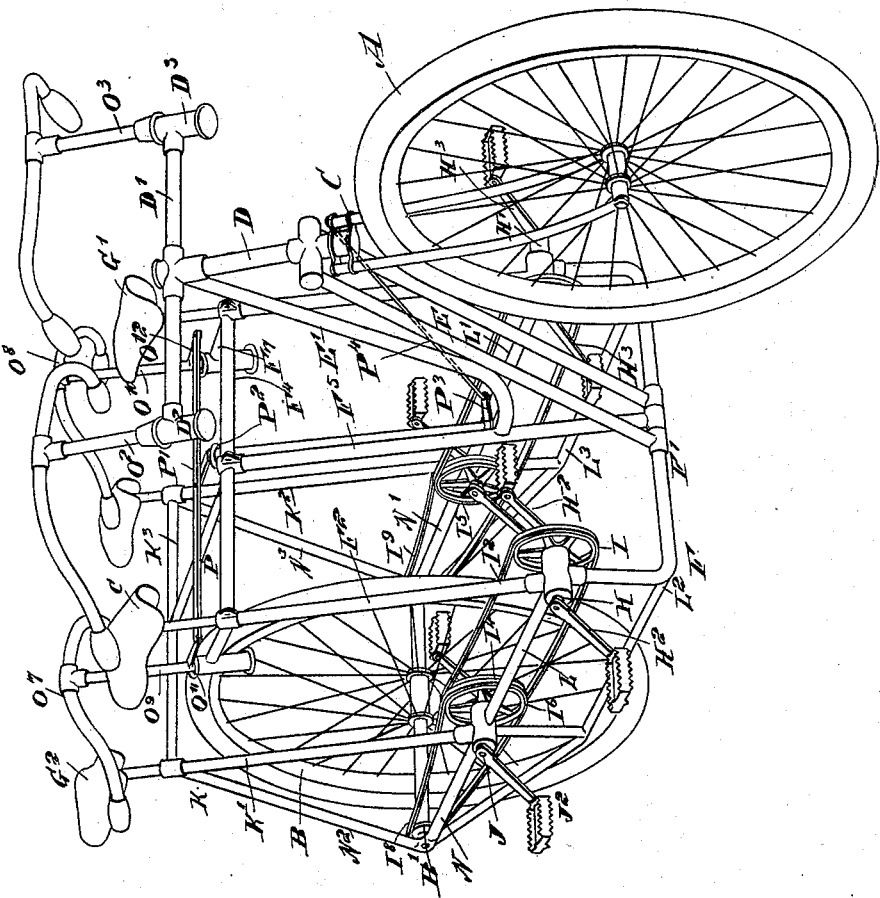

Figure 1 is a perspective view of the improvement, and Fig. 2 is a similar view of the same with a modified form of steering device.

The bicycle shown in Fig. 1 is provided with a front or steering wheel A and a rear or drive wheel B, the front wheel being journaled in the usual front fork C, having its stem mounted to turn in the steering-head D, connected by front lower braces E with the bottom cross-beam F' of a transverse frame F, provided with side arms $F^2$ $F^3$ and a top cross-arm $F^4$. The arms F' and $F^4$ are connected with each other by a center brace $F^5$, also connected by a brace E' with the upper end of the steering-head D, the said braces E' E forming a connection between the transverse frame F and the steering-head D in such a manner that both sides of the frame F remain open at the front on opposite sides of the connection.

In the side arms $F^2$ and $F^3$ of the front frame F and near the lower ends of the said arms are journaled the pedal-shafts H H', respectively, carrying the crank-arms $H^2$ $H^3$, respectively, provided with the usual pedals to be engaged by the feet of the riders seated on the seats G G', held in the upper ends of the said side arms $F^2$ $F^3$, respectively.

On the pedal or crank shafts H H' are secured the sprocket-wheels I I', respectively, connected by sprocket-chains $I^2$ $I^3$, respectively, with the sprocket-wheels $I^4$ $I^5$, respectively, secured on the second set of crank or pedal shafts J J', carrying the crank-arms $J^2$ $J^3$, respectively, having the usual pedals. The crank-shafts J J' are journaled in the side arms K' $K^2$ of a second or rear frame K, provided with a top cross-arm $K^3$, connecting the side arms K' $K^2$ with each other, and the middle of this cross-arm $K^3$ is connected by a longitudinal brace $K^4$ with the middle of the top cross-arm $F^4$ of the front frame F.

The front and rear frames F and K are further connected with each other by lower braces L L', attached to the bosses carrying the crank or pedal shafts H J and H' J'. Longitudinal bottom braces $L^2$ $L^3$ connect the extreme lower ends of the side arms $F^2$ K' and $F^3$ $K^2$ with each other, and the extreme rear ends of said bottom braces $L^2$ $L^3$ extend upwardly and rearwardly to connect with the rear lower braces N N', extending from the bosses for the shafts J J', rearwardly in alinement with the braces L L'. In the rear ends of these rear lower braces N N' is journaled the drive-wheel B, and the rear ends of the said braces are connected by the upper rear braces $N^2$ $N^3$ with the upper ends of the side arms K' $K^2$ of the rear frame K.

The rear set of pedal-shafts J J' are also provided with sprocket-wheels $I^6$ $I^7$, connected by sprocket-chains $I^8$ $I^9$, respectively, with the usual sprocket-wheels B' on the hub of the rear drive-wheel B. Saddles $G^2$ $G^3$ are held in the upper ends of the side arms K' $K^2$, respectively, said saddles being in longitudinal alinement with the saddles G G', respectively.

The handle-bars O O' for the front saddles G G' are mounted in heads $D^2$ $D^3$, respectively, formed on the ends of a cross-arm D', held on the upper end of the head D. The handlebar stems $O^2$ $O^3$ are provided with lugs $O^4$ $O^5$, respectively, connected with each other by a link $O^6$, also pivotally connected with a lug C', formed on the upper end of the steering-post of the fork C. Thus when either handlebar O O' is actuated by the rider of the saddle G or G' a steering of the front wheel A is accomplished.

The handle-bars $O^7$ $O^8$ for the rear saddles $G^2$ $G^3$ may be held stationary in longitudinal branch arms $F^6$ $F^7$, forming part of the front frame F, the said branch arms extending from the upper ends of the side arms $F^2$ $F^3$, as plainly shown in Fig. 1. If desired to use the handle-bars $O^7$ $O^8$ for steering purposes, as shown in Fig. 2, then the stems $O^9$ $O^{10}$ of the said handle-bars are provided with lugs $O^{11}$ $O^{12}$, respectively, connected with each other by a link P, pivotally connected by a link P' with a shaft $P^2$, mounted to turn in suitable bearings arranged on the center braces $F^5$ for the front frame F.

The lower end of the shaft $P^2$ is provided with an arm $P^3$, connected by a link $P^4$ with one side of the fork C, so that a turning of either handle-bar $O^7$ or $O^8$ causes a turning of the fork C by the intermediate means described for steering the front wheel to the right or the left, according to the direction in which the said rear handle-bars $O^7$ $O^8$ are turned. If desired, the steering arrangement from the front handle-bars O O' may be omitted, as shown in Fig. 2, and in this case the stems $O^2$ $O^3$ are held rigidly in the heads $D^2$ $D^3$, respectively. Thus by the arrangement described the steering may be accomplished by any one of the persons in any of the four seats.

It will further be seen that by having the open front frame F constructed in the manner described it enables the riders to readily get on and off the seats G G', as there is absolutely no obstruction on either side of the frame or in front thereof. It will also be seen that an easy mounting and dismounting of the rear saddles is had owing to the open space between the side arms of the front and rear frames F and K.

Having thus described my invention, I claim as new and desire to secure by Letters Patent—

1. A bicycle provided with a front frame extending transversely and having side arms and top and bottom cross-arms connecting the side arms, a center brace located between and parallel with the side arms and connecting the top and bottom cross-arms, a brace connecting the said center brace with the upper part of the steering-head for the front wheel, braces connecting the said steering-head with the bottom cross-arm at each side of the said center brace, and a saddle and a pedaling device carried at each side of the said frame substantially as shown and described.

2. In a bicycle, the combination with a front frame extending transversely and provided with side arms and top and bottom cross-arms, a center brace connecting the said top and bottom cross-arms, and a brace connecting said center brace with the steering-head of the front wheel to leave the side of the frame open at the front on both sides of the said brace, of a rear frame extending transversely and adapted to carry the rear or drive wheel, a longitudinally-extending brace connecting the middle portion of the top of the rear frame with the middle portion of the top of the front frame, and braces connecting the lower portions of the sides of the front and rear frames with each other, whereby an open space is left between the sides of the front and rear frames, the sides of the front and rear frames being arranged to carry saddles and pedaling devices, substantially as shown and described.

3. In a bicycle, a frame comprising a transversely-extending front frame adapted to carry saddles and pedaling devices, the said front frame being provided with side arms and top and bottom cross-arms connecting the side arms, a center brace connecting the top and bottom cross-arms, a steering-head for the front wheel, a brace connecting the upper part of the steering-head with the said center brace, braces connecting the lower part of the steering-head with the bottom cross-arm of the frame at each side of the center brace, and a transversely-extending rear frame connected with the front frame and arranged to carry the rear wheel and also arranged to carry saddles and pedaling devices, substantially as shown and described.

4. In a bicycle, a transversely-extending front frame adapted to carry saddle and pedaling devices and having side arms connected by top and bottom cross-arms, a center brace connecting the top and bottom cross-arms, a steering-head provided with forks for the front wheel, a cross-arm held on the upper end of the steering-head and provided at each end with a head for the handle-bars, a brace connecting the upper part of the steering-head with the said center brace, braces connecting the lower part of the steering-head with the bottom cross-arm of the frame at each side of the center brace, and a transversely-extending rear frame connected with the front frame and arranged to carry the rear wheel and also arranged to carry saddles and pedaling devices, substantially as shown and described.

5. A bicycle, comprising a transversely-extending front frame having side arms connected by top and bottom cross-arms, a center brace connecting the top and bottom cross-arms a steering-head provided with forks for the front wheel, a brace connecting the upper part of the steering-head with the said center brace, a lower brace connecting the said steering-head with the bottom cross-arm, a transversely-extending rear frame connected with the front frame and carrying the rear or drive wheel, saddles and pedaling devices carried by each side of the front and the rear frame, and steering devices for the said front fork, substantially as shown and described.

6. In a bicycle, a transversely-extending front frame having side arms connected by top and bottom cross-arms, a center brace connecting the top and bottom cross-arms, a steering-head provided with forks for the front wheel, a brace connecting the upper part of the steering-head with the said center brace, a lower brace connecting the said steering-head with the bottom cross-arm of the front frame, a transversely-extending rear frame connected with the front frame and carrying the rear or drive wheel, saddles and pedaling devices carried by each side of the front and the rear frame, a handle-bar for each of the saddles, and steering devices for the front fork, substantially as shown and described.

7. A bicycle-frame comprising a transversely-extending front frame provided with side arms and a top and bottom cross-arm, a center brace connecting the top and bottom cross-arms, a steering-head for the front fork, inclined braces connecting the said steering-head with the bottom cross-bar at each side of the said center brace, a brace connecting the upper end of the steering-head with the center brace of the said front frame, a transversely-extending rear frame connected by longitudinally-extending braces with the front frame and comprising side arms and a cross-arm connecting the side arms, the said rear frame having a rearward extension at each side in which the rear wheel of the bicycle is adapted to be journaled, the sides of the front and the rear frame being arranged to carry saddles and pedaling devices, substantially as shown and described.

8. A bicycle, comprising a transversely-extending front frame carrying saddles and pedaling devices at its sides, a transversely-extending rear frame carrying the rear wheel of the bicycle and likewise carrying saddles and pedaling devices at its sides, a central longitudinally-extending brace connecting the upper parts of the front and the rear frames, braces connecting the sides of the said front and rear frames near the bottoms thereof, arms extending rearwardly from each side of the front frame and carrying the rear handle-bars, a steering-head in which the fork of the front wheel is mounted, a rearwardly-extending brace connecting the said steering-head with the front frame, and a cross-arm held on the upper end of the steering-head and provided at each end with a head for the front handle-bars, substantially as shown and described.

9. A bicycle, comprising a transversely-extending front frame carrying saddles and pedaling devices at its sides, a transversely-extending rear frame carrying the rear wheel of the bicycle and also carrying saddles and pedaling devices at its sides, a central longitudinally-extending brace connecting the top portions of the front frame with the top portion of the rear frame, longitudinally-extending braces connecting the side of the said front and rear frames, at the lower portion thereof, horizontally-arranged arms extending rearwardly from the sides of the front frame and carrying the rear handle-bars, a steering-head in which the fork of the front wheel is mounted, a brace connecting the said steering-head with the front frame, a cross-arm held on the upper end of the steering-head and provided at each end with a head for the front handle-bars, and a connection between the stems of the front handle-bars and the front fork for steering the bicycle, substantially as shown and described.

10. In a bicycle, a front frame comprising side arms connected by a top and a bottom cross-arm, a center brace connecting the said top and bottom cross-arms, the said side arms being arranged to carry saddles at their upper ends, and pedaling devices near their lower ends, a rear frame having side arms connected by a top cross-arm, the said rear frame being likewise arranged to carry saddles and pedaling devices at the sides, a central longitudinally-extending brace connecting the top cross-arm of the rear frame with the top cross-arm of the front frame, lower braces attached to the bosses carrying the pedal-shafts and connecting the side arms of the front and rear frames, longitudinal bottom braces connecting the extreme lower ends of the side arms of the front and rear frames with each other, the extreme rear ends of the said bottom braces extending upwardly and rearwardly to connect with rear lower braces extending rearwardly from the bosses of the pedal-shafts of the rear frame, the rear ends of the said rear lower braces being arranged to carry the rear wheel of the bicycle, upper rear braces connecting the rear ends of the said lower rear braces with the upper ends of the side arms of the rear frame, arms extending rearwardly from the upper part of the side arms of the front frame and adapted to carry the rear handle-bars, a steering-head for the fork of the front wheel, rearwardly-extending braces connecting the lower part of said steering-head with the lower cross-arm of the front frame, a brace connecting the upper part of the steering-head with the center brace of the front frame, and a cross-arm held on the upper end of the steering-head and provided at each end with a head for the front handle-bars substantially as shown and described.

ALBERT SHELDON WEAVER.

Witnesses:
THEO. G. HOSTER,
A. A. HOPKINS.